United States Patent [19]

Parks et al.

[11] Patent Number: 5,239,445
[45] Date of Patent: Aug. 24, 1993

[54] METHOD AND APPARATUS FOR SIMULTANEOUS OPERATION OF TWO IDE DISK DRIVES

[75] Inventors: Terry J. Parks, Round Rock; Joseph M. Maurin; Kenneth L. Jeffries, both of Austin, all of Tex.

[73] Assignee: Dell USA L.P., Austin, Tex.

[21] Appl. No.: 630,599

[22] Filed: Dec. 20, 1990

[51] Int. Cl.⁵ ............... H05K 7/00; H01R 11/01; H04L 23/00; H01B 11/02
[52] U.S. Cl. .................. 361/729; 361/679; 439/502; 375/36; 375/121; 307/147
[58] Field of Search ............... 439/502, 505, 638, 651; 361/380, 390, 391, 392, 393, 395, 399; 364/708; 375/36, 121; 174/72 A, 72 TR

[56] References Cited

U.S. PATENT DOCUMENTS

| | | | |
|---|---|---|---|
| 3,609,462 | 9/1971 | De Barros | 361/415 |
| 3,705,378 | 12/1972 | Elkins | 439/638 |
| 4,579,407 | 4/1986 | Shimada | 439/502 |
| 4,941,845 | 7/1990 | Eppley et al. | 439/505 |
| 4,954,100 | 9/1990 | McCleery | 439/502 X |
| 4,954,101 | 9/1990 | Nelson | 439/502 |
| 4,988,890 | 1/1991 | Norhi et al. | 439/505 X |

FOREIGN PATENT DOCUMENTS

| | | | |
|---|---|---|---|
| 93398 | 11/1983 | European Pat. Off. | 439/502 |
| 2617651 | 1/1989 | France | 439/651 |
| 2-288176 | 11/1990 | Japan | 439/502 |

OTHER PUBLICATIONS

A. W. Northrup et al., "Isolation Circuit Tool", IBM Technical Disclosure Bulletin, vol. 3, No. 1, pp. 7 & 8, Jun. 1960.

"A Case for Redundant Arrays of Inexpensive Disks (RAID)", Patterson, et al., University of California Berkeley, California, 1987.

Primary Examiner—Leo P. Picard
Assistant Examiner—Michael W. Phillips
Attorney, Agent, or Firm—Thomas G. Devine; James W. Huffman

[57] ABSTRACT

An apparatus and method for a computer system to rapidly access at least two IDE disk drives. Use of standard forty pin connectors and forty wire ribbon cable having certain pairs of wires uniquely twisted so as to allow the system to independently access the IDE drives.

12 Claims, 5 Drawing Sheets

| Pin | Signal | | Pin | Signal | | Pin | Signal 1 |
|---|---|---|---|---|---|---|---|
| 1 | Reset | | 1 | Reset | | 1 | Reset |
| 2 | Gnd | | 2 | Gnd | | 2 | Gnd |
| 3 | DD7 | | 3 | DD7 | | 3 | DD7 |
| 4 | DD8 | | 4 | DD8 | | 4 | DD8 |
| 5 | DD6 | | 5 | DD6 | | 5 | DD6 |
| 6 | DD9 | | 6 | DD9 | | 6 | DD9 |
| 7 | DD5 | | 7 | DD5 | | 7 | DD5 |
| 8 | DD10 | | 8 | DD10 | | 8 | DD10 |
| 9 | DD4 | | 9 | DD4 | | 9 | DD4 |
| 10 | DD11 | | 10 | DD11 | | 10 | DD11 |
| 11 | DD3 | | 11 | DD3 | | 11 | DD3 |
| 12 | DD12 | | 12 | DD12 | | 12 | DD12 |
| 13 | DD2 | | 13 | DD2 | | 13 | DD2 |
| 14 | DD13 | | 14 | DD13 | | 14 | DD13 |
| 15 | DD1 | | 15 | DD1 | | 15 | DD1 |
| 16 | DD14 | | 16 | DD14 | | 16 | DD14 |
| 17 | DD0 | | 17 | DD0 | | 17 | DD0 |
| 18 | DD15 | | 18 | DD15 | | 18 | DD15 |
| 19 | Gnd | | 19 | Gnd | | 19 | Gnd |
| 20 | Key | | 20 | Key | | 20 | Key |
| 21 | DIOW2 | | 21 | Unused | | 21 | Unused |
| 22 | Gnd | | 22 | Gnd | | 22 | Gnd |
| 23 | DIOW1 | | 23 | DIOW | | 23 | DIOW |
| 24 | Gnd | | 24 | Gnd | | 24 | Gnd |
| 25 | DIOR1 | | 25 | DIOR | | 25 | DIOR |
| 26 | Gnd | | 26 | Gnd | | 26 | Gnd |
| 27 | DIOR2 | | 27 | Unused | | 27 | Unused |
| 28 | SPSYNC | | 28 | SPSYNC | | 28 | SPSYNC |
| 29 | INTRQ2 | | 29 | Unused | | 29 | Unused |
| 30 | Gnd | | 30 | Gnd | | 30 | Gnd |
| 31 | INTRQ1 | | 31 | INTRQ | | 31 | INTRQ |
| 32 | IOCS16 | | 32 | IOCS16 | | 32 | IOCS16 |
| 33 | DA1 | | 33 | DA1 | | 33 | DA1 |
| 34 | PDIAG | | 34 | PDIAG | | 34 | PDIAG |
| 35 | DA0 | | 35 | DA0 | | 35 | DA0 |
| 36 | Da2 | | 36 | Da2 | | 36 | Da2 |
| 37 | CS1-3 | | 37 | CS1 | | 37 | CS1 |
| 38 | CS3-1 | | 38 | CS3 | | 38 | CS3 |
| 39 | DASP | | 39 | DASP | | 39 | DASP |
| 40 | Gnd | | 40 | Gnd | | 40 | Gnd |

FIG. 2

| Pin | Signal |
|---|---|
| 1 | Reset |
| 2 | Gnd |
| 3 | DD7 |
| 4 | DD8 |
| 5 | DD6 |
| 6 | DD9 |
| 7 | DD5 |
| 8 | DD10 |
| 9 | DD4 |
| 10 | DD11 |
| 11 | DD3 |
| 12 | DD12 |
| 13 | DD2 |
| 14 | DD13 |
| 15 | DD1 |
| 16 | DD14 |
| 17 | DD0 |
| 18 | DD15 |
| 19 | Gnd |
| 20 | Key |
| 21 | DIOW2 |
| 22 | Gnd |
| 23 | DIOW1 |
| 24 | Gnd |
| 25 | DIOR1 |
| 26 | Gnd |
| 27 | DIOR2 |
| 28 | SPSYNC |
| 29 | INTRQ2 |
| 30 | Gnd |
| 31 | INTRQ1 |
| 32 | IOCS16 |
| 33 | DA1 |
| 34 | PDIAG |
| 35 | DA0 |
| 36 | Da2 |
| 37 | CS1-3 |
| 38 | CS3-1 |
| 39 | DASP |
| 40 | Gnd |

100

| Pin | Signal |
|---|---|
| 1 | Reset |
| 2 | Gnd |
| 3 | DD7 |
| 4 | DD8 |
| 5 | DD6 |
| 6 | DD9 |
| 7 | DD5 |
| 8 | DD10 |
| 9 | DD4 |
| 10 | DD11 |
| 11 | DD3 |
| 12 | DD12 |
| 13 | DD2 |
| 14 | DD13 |
| 15 | DD1 |
| 16 | DD14 |
| 17 | DD0 |
| 18 | DD15 |
| 19 | Gnd |
| 20 | Key |
| 21 | Unused |
| 22 | Gnd |
| 23 | DIOW |
| 24 | Gnd |
| 25 | DIOR |
| 26 | Gnd |
| 27 | Unused |
| 28 | SPSYNC |
| 29 | Unused |
| 30 | Gnd |
| 31 | INTRQ |
| 32 | IOCS16 |
| 33 | DA1 |
| 34 | PDIAG |
| 35 | DA0 |
| 36 | Da2 |
| 37 | CS1 |
| 38 | CS3 |
| 39 | DASP |
| 40 | Gnd |

102

| Pin | Signal 1 |
|---|---|
| 1 | Reset |
| 2 | Gnd |
| 3 | DD7 |
| 4 | DD8 |
| 5 | DD6 |
| 6 | DD9 |
| 7 | DD5 |
| 8 | DD10 |
| 9 | DD4 |
| 10 | DD11 |
| 11 | DD3 |
| 12 | DD12 |
| 13 | DD2 |
| 14 | DD13 |
| 15 | DD1 |
| 16 | DD14 |
| 17 | DD0 |
| 18 | DD15 |
| 19 | Gnd |
| 20 | Key |
| 21 | Unused |
| 22 | Gnd |
| 23 | DIOW |
| 24 | Gnd |
| 25 | DIOR |
| 26 | Gnd |
| 27 | Unused |
| 28 | SPSYNC |
| 29 | Unused |
| 30 | Gnd |
| 31 | INTRQ |
| 32 | IOCS16 |
| 33 | DA1 |
| 34 | PDIAG |
| 35 | DA0 |
| 36 | Da2 |
| 37 | CS1 |
| 38 | CS3 |
| 39 | DASP |
| 40 | Gnd |

METHOD AND APPARATUS FOR SIMULTANEOUS OPERATION OF TWO IDE DISK DRIVES

CROSS REFERENCE TO RELATED APPLICATION

This application is related to the following U.S. patent application: Ser. No. 07/628,505. "Method and Apparatus For Reducing Write Latency In Redundant Disk Arrays"

Inventors: Parks, et al. Filed: Dec. 14, 1990

BACKGROUND OF THE INVENTION

1. Field of the Invention

The system and method of the present invention relates generally to computer digital storage systems, and in particular to computer systems using a plurality of disk drives.

2. Description of the Related Technology

Personal computers have gained substantial popularity among individual users for both business and home use. Personal computers are now being utilized for jobs heretofore performed by mainframe computers and minicomputers. The rapidly growing popularity in the use of personal computers may, in part, be attributed to the substantial improvement in both its speed of operation and its memory capacity of both random access memory (RAM) and disk.

Applications such as transaction-processing which have a high rate of random requests for small amounts of data, or large simulations requiring massive amounts of data that are in excess of the main memory capacity require memory storage capacity only available by using disk storage technology. Mass production of disk systems for personal computers have created low cost and high performance disks having data storage capacities of a hundred megabytes or more. Where a greater disk memory capacity is required, a number of these disks may be used.

Present disk drive technology has integrated the drive electronics ("IDE") in with the drive itself, as in the Conner drive, type CP3204. However, the IDE drive was also intended to be software compatible with existing disk drive controllers such as the WD-1003 manufactured by Western Digital Corporation. Originally, the WD-1003 architecture disk drive controllers were designed to support two disk drives without IDE. IDE drives were adapted so that two could be used. This adaptation requires that both IDE drives monitor the task file register set in each controller, but only allows the drive selected by the drive bit in the SDH (select drive head) register to respond to read requests and to interpret commands.

This adaptation achieves compatibility with the WD-1003 type controller, however, it wastes IDE disk performance. Potential performance is lost because there are two disk drive controllers integral with the two IDE drives but only one controller may be used at a time. This limitation is mandated in order to maintain compatibility with existing disk controller system standards.

The prior art solved the limitation of only being able to access one drive at a time by utilizing a fifty pin connector on an Intelligent Disk Array ("IDA") controller card and by connecting ten wires in the cable going from the IDA controller to each IDE drive. Connection of ten wires connected to pins 31 through 40 and connection of ten wires to pins 41 through 50 of the IDE connector made it unique for each drive. This method has the disadvantage of increasing the costs associated with the connector and cable, and, most importantly, it uses up precious space on the IDA controller card.

SUMMARY OF THE INVENTION

In contrast to prior methods and systems for rapid communication with two IDE drives, the system and method of the present invention uses a forty pin cable connector and forty wire cable in conjunction with a multi-disk adapter. The system and method of the present invention overcomes the problems and limitations of the prior art by utilizing unused wires in the cable, twisted in a unique way, so that standard IDE drive connections are maintained. By twisting four pairs of wires in the cable and utilizing unused connector pins at the controller, two interface control line sets are created on the same form factor as a standard IDE drive cable/connector set.

An IDE drive connector has forty pins arranged in two rows of twenty pins each. A forty conductor flat ribbon cable connects to each IDE connector and to the disk controller connector. Thirty-seven of the cable wires are used for signals and grounds, three wires are unused. The system and method of the present invention accomplishes the above results by utilizing the unused wires to carry additional control signals from the multi-disk adapter to the IDE disk drives without disturbing the standard signal wiring configuration to each IDE drive. The multi-disk adapter of the invention utilizes these unused wires to rapidly access both IDE drives in succession then allows both IDE disk drives to process the commands and data simultaneously.

The forty wire cable connects to a forty pin multi-disk adapter connector. Each wire connects to a corresponding pin on the adapter connector. The other end of the wires in this cable connect to another forty pin connector used for IDE disk drive 2. All wire connections to the connector pins of the adapter and the IDE disk drive 2 correspond except as follows; adapter connector pin 37 connects to IDE disk drive 2 pin 38, adapter connector pin 31 connects to IDE disk drive 2 pin 29, adapter connector pin 27 connects to disk 2 pin 25, and adapter connector pin 23 connects to IDE disk drive 2 pin 21.

The forty wire cable also connects to a third forty pin connector used for IDE disk drive 1. The same four pairs of wires are twisted again between the IDE disk drive 2 connector and the IDE disk drive 1 connector. Twisting of the four wire pairs a second time results in the original standard signal connections from the multi-disk adapter reappearing on the IDE disk drive 1 connector. By twisting the four wire pairs, the disk controller interface has two sets of input-output ("I/O") read and write signals, two sets of interrupt request lines, and two chip select signals to control up to four IDE disk drives.

Placing the IDE disk drive 2 connector between the multi-disk adapter and the IDE disk drive 1 connector, and twisting the four wire pairs twice are for manufacturing convenience. As can be appreciated by those skilled in the art, the system and method of this invention are equally applicable to placing the IDE disk drive 1 connector between the multi-disk adapter connector and the IDE disk drive 2 connector, and twisting the four wire pairs only once, before the disk 2 connector.

An object of the present invention is to independently control at least two IDE disk drives over a forty wire cable.

A further object of the present invention is to utilize standard IDE disk drive connectors for connecting to at least two IDE disk drives.

Another object of the present invention is to uniquely twist four pairs of wires of a forty wire cable so that two sets of input-output read and write signals, two sets of interrupt request lines and two chip select signals are available for a multi-disk controller to independently control at least two IDE disk drives.

Still another object of the present invention is to rapidly control at least two IDE drives sequentially and have these drives continue to process commands and data simultaneously.

Yet a further object of the present invention to twist some of the cable wires so as to simplify the manufacture of the connector cable assembly.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 2 is a schematic diagram of a connector/cable assembly of the present invention;

FIG. 4 is a schematic diagram of another embodiment of a connector/cable assembly of the present invention.

DETAILED DESCRIPTION OF THE PREFERRED EMBODIMENT

Figure 1:
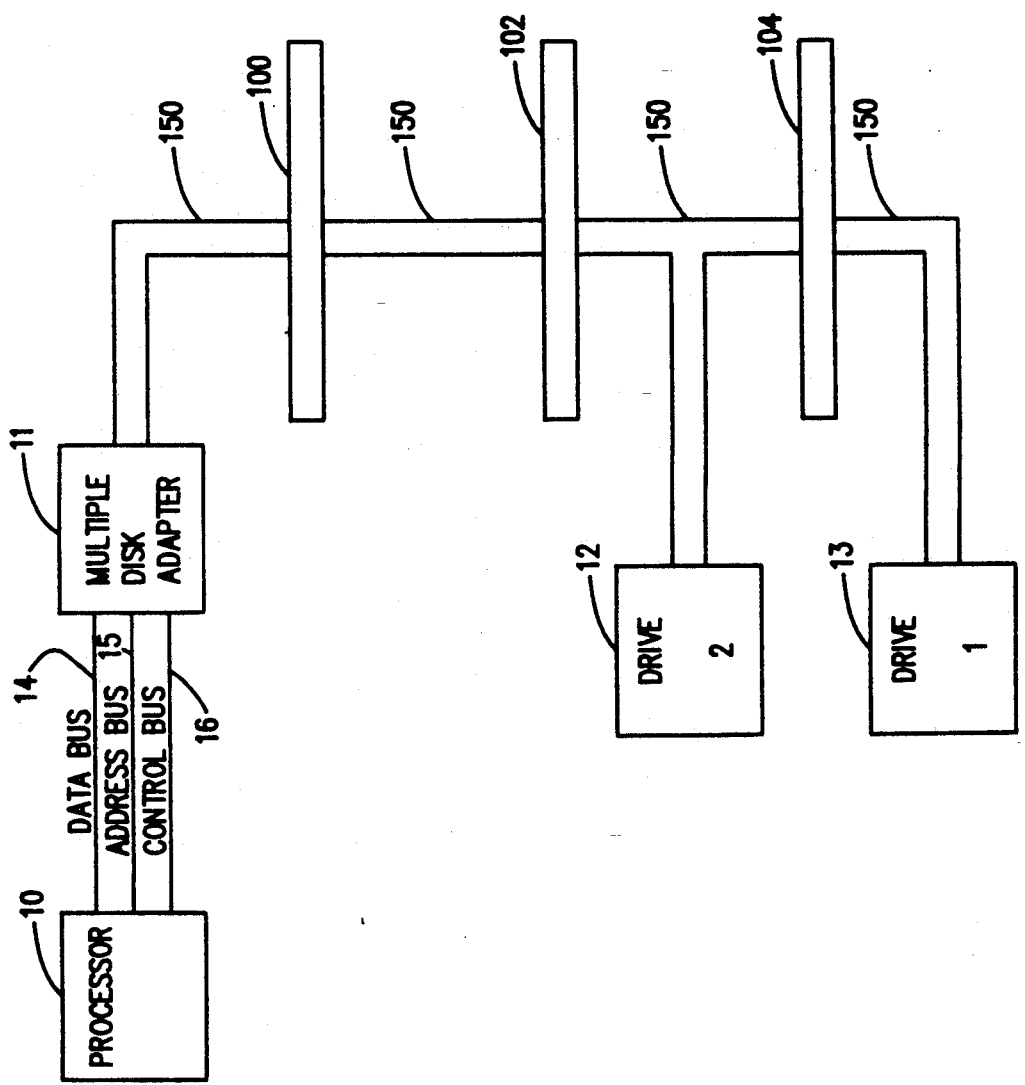
FIG. 1 is a block diagram of the system of the present invention.

Referring now to the drawings, the details of the preferred embodiment are schematically illustrated. In the drawings the letter S designates generally the connector/cable system of the invention.

FIG. 1 illustrates processor 10 (an Intel type 80386 in this preferred embodiment) connected to multiple disk adapter 11 through data bus 14, address bus 15, and control bus 16. Multiple disk adapter 11 simply enables communication between processor 10 and the integrated controllers in drives 1 (13) and 2 (12). Adapter 11 is a programmable array of logic (PAL) in this preferred embodiment but may take any other desired form to perform its simple function.

Multiple disk adapter 11 is connected through cable 150 to connector 100. Connector 100 connects through cable 150 to connector 102. The cabling to and from connector 102 contains twisted pairs of wires which will be described below. Connector 102 is connected to drive 2 and to connector 104 through cable 150. Connector 104 connects to drive 1 through cable 150.

In FIG. 2, the connector/cable system S connects to multi-disk adapter 11 by connector 100, a first IDE disk drive 13 by connector 104 and a second IDE disk drive 12 by connector 102. Forty wires $150_i$, where i=1 to 40, connect to connector pins 1-40 of connectors 100, 102 and 104. These forty wires may be comprised of a flat ribbon cable or any other type of cable easily adaptable for connection to the pins of edge connectors.

Pins 1-20 of connectors 100, 102 and 104 are connected in parallel by means of cable wires $150_i$. All pins of connector 100 are connected to correspondingly numbered connector pins of connector 104 by means of wires $150_i$. All pins of connector 100 are connected to correspondingly numbered connector pins of connector 102 except for pins 21, 23, 25, 27, 29, 31, 37 and 38. Connector 102 has eight pin connections transposed by twisting four pair of wires $150_i$.

Figure 3:
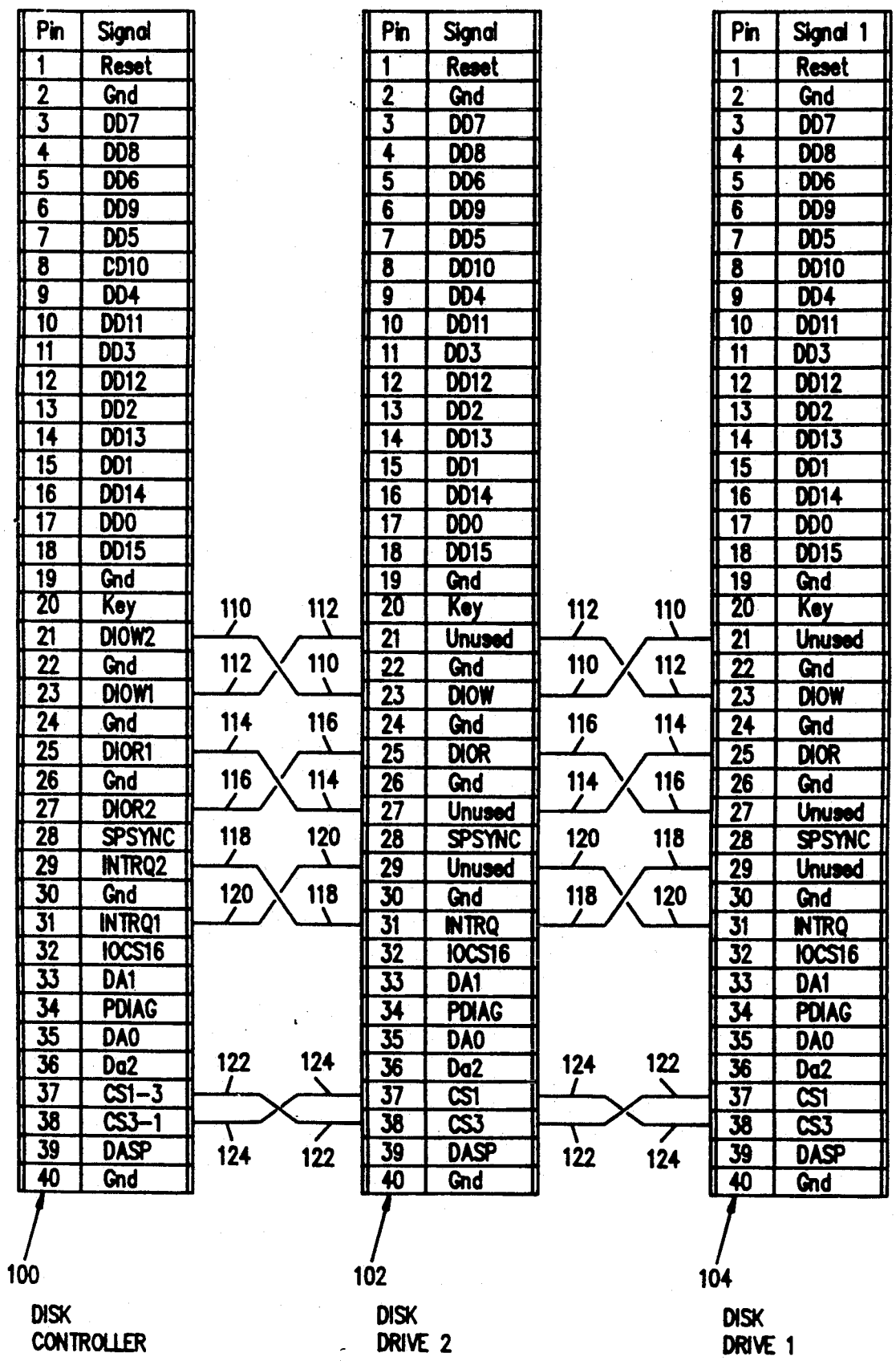
FIG. 3 is a partial schematic diagram of the connector/cable assembly of FIG. 2.

Referring now to FIG. 3, four pair of twisted wires are illustrated. Wires 110 and 112 from the first pair, wires 114 and 116 form the second pair, wires 118 and 120 form the third pair and wires 122 and 124 form the fourth pair. The first twist in the first pair of wires 110 and 112 connect pins 21 and 23 of connector 100 to pins 23 and 21 respectively of connector 102. The first twist in the second pair of wires 114 and 116 connect pins 25 and 27 of connector 100 to pins 27 and 25 respectively of connector 102. The first twist in the third pair of wires 118 and 120 connect pins 29 and 31 of connector 100 to pins 31 and 29 respectively of connector 102. The first twist in the fourth pair of wires 122 and 124 connect pins 37 and 38 of connector 100 to pins 39 and 38 respectively of connector 102.

In similar fashion, the second twist in the first pair of wires 110 and 112 connect pins 23 and 21 of connector 102 to pins 21 and 23 respectively of connector 104. The second twist in the second pair of wires 114 and 116 connect pins 27 and 25 of connector 102 to pins 25 and 27 respectively of connector 104. The second twist in the third pair of wires 118 and 120 connect pins 31 and 29 of connector 102 to pins 29 and 31 respectively of connector 104. The second twist in the fourth pair of wires 122 and 124 connect pins 38 and 37 of connector 102 to pins 38 and 39 respectively of connector 104.

These twists are inserted into the cable for ease in manufacturing, once before drive 2 connector 102 and once again after drive 2 connector 102 but before drive 1 connector 104. The twists allow different control signals from the multi-disk adapter connector 100 to control each IDE drive independently of the other IDE drive. The multi-disk adapter has two I/O read (DIOR1 and DIOR2) control lines, two I/O write (DIOW1 and DIOW2) control lines, and two interrupt request (INTRQ1 and INTRQ2) lines. Chip selects (CS1-3 and CS3-1) are transposed between the two IDE drives connected to the cable.

The multi-disk adapter accesses IDE drive 1, which is the second drive on the cable at connector 104 having the untwisted signals, by either requesting a read (DIOR1) or write (DIOW1) operation and applies chip select 1 to CS1-3 and chip select 3 to CS3-1. The IDE drive 1 responds with interrupts on INTRQ1. The multi-disk adapter accesses IDE drive 2, which is the first drive on the cable at connector 102 having the twisted signals, by either requesting a read (DIOR2) or write (DIOW2) operation and applies chip select 1 to CS3-1 and chip select 3 to CS1-3. The IDE drive 2 responds with interrupts on INTRQ2.

Only one IDE drive may be accessed at a time, however, accessing by the multi-disk adapter is extremely brief, the majority of the actual disk operations are handled by the internal IDE disk controllers. In addition, up to two more IDE drives may be connected in a similar fashion and accessed by proper coding of the chip selects.

Referring now to FIG. 4, another embodiment of the invention is illustrated. All pins of connector 100 are connected to correspondingly numbered connector pins of connector 104 by means of wires 150$_i$. All pins of connector 104 are connected to correspondingly numbered connector pins of connector 102 except for pins 21, 23, 25, 27, 29, 31, 37 and 38. Connector 102 has eight pin connections transposed by twisting four pair of wires 150$_i$.

Figure 5:
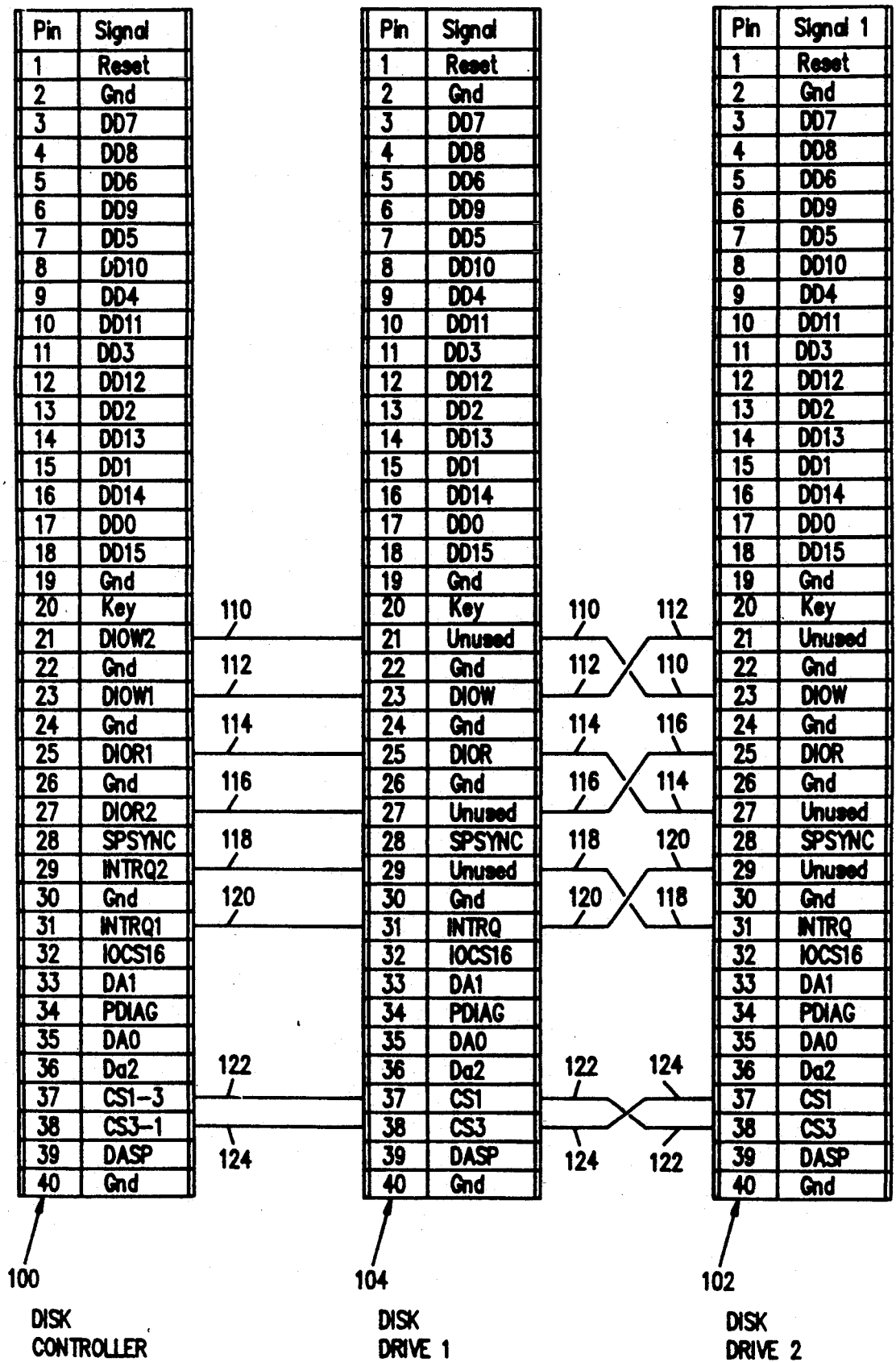
FIG. 5 is a partial schematic diagram of the connector/cable assembly of FIG. 4.

Referring now to FIG. 5, between connectors 102 and 104 four pair of twisted wires are illustrated. Wires 110 and 112 form the first pair, wires 114 and 116 form the second pair, wires 118 and 120 form the third pair and wires 122 and 124 form the fourth pair. Twisting the first pair of wires 110 and 112 connect pins 21 and 23 of connector 104 to pins 23 and 21 respectively of connector 102. Twisting the second pair of wires 114 and 116 connect pins 25 and 27 of connector 104 to pins 27 and 25 respectively of connector 102. Twisting the third pair of wires 118 and 120 connect pins 29 and 31 of connector 104 to pins 31 and 29 respectively of connector 102. Twisting the fourth pair of wires 122 and 124 connect pins 37 and 38 of connector 104 to pins 39 and 38 respectively of connector 102. These twists are inserted into the cable between drive 1 connector 104 and drive 2 connector 102, allowing different control signals from the multi-disk adapter connector 100 to control each IDE drive independently.

The system and method of the present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art and which are encompassed within the spirit of the invention and the scope of the appended claims.

What is claimed is:

1. A computer system including a processor and multiple disk adapter having provisions for the attachment of two or more IDE disk drives, a cable/connector assembly for connecting the disk adapter to at least two IDE disk drives, comprises:
   a first connector having a plurality of pins, said first connector connected to the multiple disk adapter;
   second and third connectors each having a plurality of pins, said second connector connected to a second IDE disk drive and said third connector connected to a first IDE disk drive, said second connector located between said first and third connectors;
   a cable having a plurality of wires, said cable wires arranged so that each wire connects to a respective pin of said first connector and each wire assumes the respective pin number of said first connector;
   said cable wires connecting pins of said first connector to corresponding pins of said second connector;
   a plurality of sets of twisted wires, each set connecting a set of pins of said first connector to a first reverse set of pins respectively of said second connector; and
   said plurality of sets of twisted wires each being twisted again to achieve pin to pin correspondence between the connection of said first and third connector pins.

2. In a computer system, including a processor and multiple disk adapter having provisions for the attachment of two or more IDE disk drives, a cable/connector assembly for connecting the disk adapter to at least two IDE disk drives, said cable/connector assembly comprising:
   a first connector having a plurality of pins, said first connector connected to the multiple disk adapter;
   second and third connectors each having a plurality of pins, said second connector connected to a second IDE disk drive and said third connector connected to a first IDE disk drive, said second connector located between said first and third connectors;
   a cable having a plurality of wires, said cable wires arranged so that each wire connects to a respective pin of said first connector and each wire assumes the respective pin number of said first connector;
   said cable wires connecting pins of said first connector to corresponding pins of said second connector;
   a first pair of twisted wires, said first twisted wires connect a first set of two pins of said first connector to a first reverse set of two pins respectively of said second connector;
   a second pair of twisted wires, said second twisted wires connect a second set of two pins of said first connector to a second reverse set of two pins respectively of said second connector;
   a third pair of twisted wires, said third twisted wires connect a third set of two pins of said first connector to a third reverse set of two pins respectively of said second connector;
   a fourth pair of twisted wires, said fourth twisted wires connect a fourth set of two pins of said first connector to a fourth reverse set of two pins respectively of said second connector; and
   said four pairs of twisted wires each being twisted again to achieve pin to pin correspondence between the connection of said first and third connector pins.

3. The computer system of claim 2, wherein each of said connectors have forty pins numbered 1–40.

4. The computer system of claim 3, wherein the 40 pins are arranged in two rows of 20 pins each.

5. The computer system of claim 2, wherein said cable wires are comprised of a flat ribbon cable.

6. The computer system of claim 2, wherein:
   said cable has forty wires and connects pins 1–20, 22, 24, 26, 28, 30, 32–36, 39 and 40 of said first connector to pins 1–20, 22, 24, 26, 28, 30, 32–36, 39 and 40 respectively of said second connector;
   said first pair of twisted wires connect pins 21 and 23 of said first connector to pins 23 and 21 respectively of said second connector;
   said second pair of twisted wires connect pins 25 and 27 of said first connector to pins 27 and 25 respectively of said second connector;
   said third pair of twisted wires connect pins 29 and 31 of said first connector to pins 31 and 29 respectively of said second connector;
   said fourth pair of twisted wires connect pins 37 and 38 of said first connector to pins 38 and 37 respectively of said second connector;
   said four pairs of cable wires 21 and 23, 25 and 27, 29 and 31, and 37 and 38 are twisted again so that pins 1–40 of said first connector connect to pins 1–40 respectively of said third connector.

7. The computer system of claim 2, further comprising:

fourth and fifth connectors each having a plurality of pins, said fourth connector connected to a fourth IDE disk drive and said fifth connector connected to a third IDE disk drive, said fourth connector located between said second and third connectors, said fifth connector located after said third connector and at the end of said cable, said fourth connector pins connect to the same cable wires as said second connector pins and said fifth connector pins connect to the same cable wires as said third connector pins, wherein four IDE disk drives may be accessed by the multiple disk adapter through said cable.

8. In a computer system, including a processor and multiple disk adapter having provisions for the attachment of two or more IDE disk drives, a cable/connector assembly for connecting the disk adapter to at least two IDE disk drives, said cable/connector assembly comprising:
   a first connector having a plurality of pins, said first connector connected to the multiple disk adapter;
   second and third connectors each having a plurality of pins, said second connector connected to a first IDE disk drive and said third connector connected to a second IDE disk drive, said second connector located between said first and third connectors;
   a cable having a plurality of wires, said cable wires arranged so that each wire connects to a respective pin of said first connector and each wire assumes the respective pin number of said first connector;
   said cable wires connecting each pin of said first connector to a corresponding pin of said second connector;
   a first pair of twisted wires, said first twisted wires connect a first set of two pins of said second connector to a first reverse set of two pins respectively of said third connector;
   a second pair of twisted wires, said second twisted wires connect a second set of two pins of said second connector to a second reverse set of two pins respectively of said third connector;
   a third pair of twisted wires, said third twisted wires connect a third set of two pins of said second connector to a third reverse set of two pins respectively of said third connector; and
   a fourth pair of twisted wires, said fourth twisted wires connect a fourth set of two pins of said second connector to a fourth reverse set of two pins respectively of said third connector.

9. The computer system of claim 8, wherein:
   said cable has forty wires;
   said cable connects pins 1–40 of said first connector to pins 1–40 respectively of said second connector;
   said cable connects pins 1–20, 22, 24, 26, 28, 30, 32–36, 39 and 40 of said second connector to pins 1–20, 22, 24, 26, 28, 30, 32–36, 39 and 40 respectively of said third connector;
   said first pair of twisted wires connect pins 21 and 23 of said second connector to pins 23 and 21 respectively of said third connector;
   said second pair of twisted wires connect pins 25 and 27 of said second connector to pins 27 and 25 respectively of said third connector;
   said third pair of twisted wires connect pins 29 and 31 of said second connector to pins 31 and 29 respectively of said third connector; and
   said fourth pair of twisted wires connect pins 37 and 38 of said second connector to pins 38 and 37 respectively of said third connector.

10. A method for computer system including a processor and multiple disk adapter having provisions for the attachment for two or more IDE disk drivedrives, a cable/connector assembly for connecting the disk adapter to at least two IDE disk drives, the method comprising the steps of;
    connecting a first connector to the multiple disk adapter, said first connector having a plurality of pins;
    connecting second and third connectors to second and first IDE disk drives respectively, said second and third connectors each having a plurality of pins, said second connector located between said first and third connectors;
    connecting the cable having a plurality of wires to said first connector pins, said cable wires arranged so that each wire connects to a respective pin of said first connector in each wire assumes the respective pin number of said first connector;
    connecting pins of said first connector to corresponding pins of said second connector by means of said cable wires;
    twisting a plurality of sets of cable wires so that each of the plurality of sets of twisted wires connect a set of pins of said first connector to a reverse set of pins respectively of said second connector; and
    twisting again each of plurality of sets of cable wires to achieve pin to pin correspondence between the connection of said first and third connector pins.

11. A method for a computer system, including a processor and multiple disk adapter having provisions for the attachment of two or more IDE disk drives, a cable/connector assembly for connecting the disk adapter to at least two IDE disk drives, said method comprising the steps of:
    connecting a first connector to the multiple disk adapter, said first connector having a plurality of pins;
    connecting second and third connectors to second and first IDE disk drives respectively, said second and third connectors each having a plurality of pins, said second connector located between said first and third connectors;
    connecting a cable having a plurality of wires to said first connector pins, said cable wires arranged so that each wire connects to a respective pin of said first connector and each wire assumes the respective pin number of said first connector;
    connecting pins of said first connector to corresponding pins of said second connector by means of said cable wires;
    twisting a pair of cable wires so that said first twisted wires connect a first set of two pins of said first connector to a first reverse set of two pins respectively of said second connector;
    twisting a second pair of cable wires so that said second twisted wires connect a second set of two pins of said first connector to a second reverse set of two pins respectively of said second connector;
    twisting a third pair of cable wires so that said third twisted wires connect a third set of two pins of said first connector to a third reverse set of two pins respectively of said second connector;
    twisting a fourth pair of cable wires so that said fourth twisted wires connect a fourth set of two pins of said first connector to a fourth reverse set of two pins respectively of said second connector;

twisting again said four pairs of cable wires to achieve pin to pin correspondence between the connection of said first and third connector pins.

12. The method of claim 11, wherein the steps of:

connecting said first and second connectors connect pins 1–20, 22, 24, 26, 28, 30, 32–36, 39 and 40 of said first connector to pins 1–20, 22, 24, 26, 28, 30, 32–36, 39 and 40 respectively of said second connector;

twisting said first pair of wires connects pins 21 and 23 of said first connector to pins 23 and 21 respectively of said second connector;

twisting said second pair of wires connects pins 25 and 27 of said first connector to pins 27 and 25 respectively of said second connector;

twisting said third pair of wires connects pins 29 and 31 of said first connector to pins 31 and 29 respectively of said second connector;

twisting said fourth pair of wires connects pins 37 and 38 of said first connector to pins 38 and 37 respectively of said second connector; and twisting each of said four pairs of wires again to achieve pin to pin correspondence between the connection of said first and third connector pins.

* * * * *